United States Patent [19]

Feasey

[11] 4,429,104

[45] Jan. 31, 1984

[54] PREPRATION OF SHAPED ARTICLES OF INTRACTABLE POLYMERS

[75] Inventor: Ronald G. Feasey, Knebworth, England

[73] Assignee: Imperial Chemical Industries PLC, London, England

[21] Appl. No.: 362,106

[22] Filed: Mar. 26, 1982

Related U.S. Application Data

[63] Continuation of Ser. No. 58,541, Jul. 17, 1977, abandoned.

[30] Foreign Application Priority Data

Jul. 31, 1978 [GB] United Kingdom ............... 31771/78

[51] Int. Cl.$^3$ ....................... C08G 63/46; C08G 63/06
[52] U.S. Cl. .................................... 528/206; 528/176; 528/193; 528/348; 528/353; 264/234; 264/235.6; 264/235.8; 264/236; 264/345; 264/346; 264/347
[58] Field of Search ............... 528/206, 193, 176, 348, 528/353; 264/236, 234, 235.6, 235.8, 347, 345, 346

[56] References Cited

U.S. PATENT DOCUMENTS

| | | | |
|---|---|---|---|
| 3,234,181 | 2/1966 | Olivier | 528/353 |
| 3,287,324 | 11/1966 | Sweeney | 528/348 |
| 3,387,058 | 6/1968 | Levine | 528/348 |
| 3,759,870 | 9/1973 | Economy et al. | 528/206 |
| 3,790,528 | 2/1974 | Tesaki et al. | 528/206 |
| 3,817,927 | 6/1974 | Kovacs et al. | 528/353 |
| 3,829,406 | 8/1974 | Cottis et al. | 528/206 |

FOREIGN PATENT DOCUMENTS 49-72379 3/1974 Japan ................................. 528/193

Primary Examiner—Harold D. Anderson
Attorney, Agent, or Firm—Cushman, Darby & Cushman

[57] ABSTRACT

Shaped articles composed of polymers formed from residues which are not melt processable characterized in that the shaped article has been formed from a readily processable melt of a copolymer containing said residues together with in-chain temperature labile residues and has been subsequently heated to remove the labile constituents with recombination of the resultant polymeric residues. Preferably the processable melt should be in the form of an anisotropic melt so that the shaped article may be in oriented form prior to removal of the residues. Typically the shaped articles are articles of thin section composed of p-hydroxybenzoic acid residues.

5 Claims, No Drawings

PREPRATION OF SHAPED ARTICLES OF INTRACTABLE POLYMERS

This is a continuation of application Ser. No. 58,541 filed July 17, 1979, now abandoned.

This invention relates to shaped articles derived from aromatic polyesters and more particularly to oriented shaped articles of wholly aromatic polyesters.

Aromatic polyesters are known which have exceptionally high melting points and which would have excellent strength and behaviour in a high temperature environment if they were capable of being formed into shaped articles. These polyesters tend to decompose near their melting points and are not suitable for conversion into shaped articles, such as fibres, by the conventional techniques involving melt processing.

A typical high performance polyester is the homopolyester containing recurring units of formula

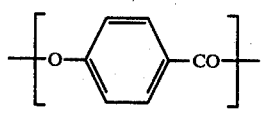

This has outstanding mechanical properties (see page 79 of the book by H G Elias, New Commercial Polymers 1969-1975, translated from the German by Mary M Exner, published by Gordon and Breach Science Publishers), but cannot be fabricated by conventional extrusion or injection moulding.

More recently further progress has been made in the field of aromatic polymers by the appreciation that melts can be formed from certain copolymers below their decomposition points and which are anisotropic. This anisotropy in the melt reduces the viscosity of the melt and permits easier processing by conventional melt fabrication techniques. Typical aromatic polyesters of this type are disclosed in U.S. Pat. Nos. 3,991,013, 3,991,014, 4,066,620, 4,075,262, German Patent applications Nos. 2 721 786 and 2 721 787, Belgian Pat. Nos. 855 246 and 855 247 and Japanese Pat. No. 43-223.

It has now been found that shaped articles of polyesters having compositions which were previously regarded as intractable or, at best, only formable with difficulty, can now be formed by simple processing methods from the melt.

According to the invention there is provided a shaped article composed of a polymer formed from residues which are not melt processable characterised in that the shaped article has been formed from a readily processable melt of a copolymer whose polymer chains are made up of said residues together with in-chain residues which are temperature labile and has been subsequently heated to remove the labile residues with recombination of the resultant polymeric residues.

By "in-chain" residues are meant recurring units which are copolymerised into and form part of the backbone of the polymer chains as distinct from groups which are present only as end-groups or side-groups on the chains.

Also included within the invention is a process of preparing a shaped article of a normally intractable polymer comprising forming a shaped article of a melt processable polymer whose polymer chains are made up of the recurring units of the intractable polymer together with temperature labile in-chain recurring units and heating the article under conditions such that the labile units are removed with recombination of the resultant polymeric residues whilst the integrity of the shaped article is maintained.

The process thus comprises forming a shaped article of a melt processable copolymer comprising:

(1) the recurring units which make up the intractable polymer and (2) labile in-chain polymer recurring units, heating the copolymer article under conditions such that the labile units are removed from the copolymer and the remaining units combine to form an intractable polymer wherein the integrity of the shaped article is maintained.

The invention is particularly useful for providing shaped articles of thin section such as films and fibres. Films and fibres of high strength, high thermal resistance and high chemical resistance are provided having compositions which were hitherto impossible to fabricate in these forms by melt processing. The invention is also applicable to applications where a thin coating of a high performance polymer may be required, for example as a coating on wire. The invention also includes applications such as thin-walled containers, which have been blow-moulded from processable melts, tubing and pipe.

Typical of a polymer having very desirable chemical and physical properties is the polyester formed from p-hydroxybenzoic acid or its derivatives. This material is known to decompose at a temperature in excess of 550° C. without melting and to be virtually insoluble in any useful solvent. Hitherto, it has been impossible to process this material by any method other than techniques such as the impact moulding technique which seriously limits the form of the shaped article. The present invention permits shaped articles which are composed essentially of residues of p-hydroxybenzoic acid to be fabricated in oriented form. Thus, shaped articles formed from an anisotropic melt processable polyester consisting of residues of p-hydroxybenzoic acid and a labile constitutent are heated under controlled conditions to volatilise the labile constituent and leave a shaped article consisting essentially of residues of p-hydroxybenzoic acid. It is preferred that the shaped article, particularly when in the form of a fibre, should be restrained during the heating process to prevent shrinkage.

Although not essential it is preferred that the polymer containing the labile constituents (hereinafter termed the "prepolymer") should be capable of forming an anisotropic melt because such melts are more readily processable but, more importantly, because articles formed from such melts are oriented and consequently have higher strength in the oriented direction than non-oriented articles or require less post heat-treatment and drawing to give high strength articles. Orientation may also be introduced during the removal of the labile residues by stretching.

By "capable of forming an anisotropic melt" is meant that the copolyesters form such melts when heated to a particular temperature range or can be induced to form such a melt by the application of shear to the melt. The latter state is characterised by the persistence of the anisotropic condition for a period of a second or two after the melt ceases to be sheared. This distinguishes it from the well-known observation that a poly(ethylene terephthalate) melt will exhibit order when sheared by passing the melt through a tube. Such order disappears immediately the melt ceases to be sheared.

The ability of a polymer to exhibit anisotropic melt behaviour is best determined by examining the appearance of the polymer under crossed polarisers as the polymer is heated up to and above temperatures at which the polymer flows. Optically anisotropic materials have the property of causing light to be transmitted when viewed with such an optical system. The melts are also sometimes turbid, show opalescence or may even whiten under shear. The observance of such a phenomenon indicates substantial alignment or other cooperative alignment of the polymer chains in the melt (hereinafter termed "liquid crystal formation"), from which it can be assumed that the melts would very often have much lower viscosities than isotropic melts of the same materials with randomly distributed polymer chains.

The invention also includes anisotropic melts of the copolyesters of the invention and shaped articles formed from these melts.

Suitable prepolymers, capable of forming anisotropic melts, are included in the disclosure of our copending British Appplication of even date herewith, entitled Aromatic Copolyesters Capable of Forming an Anisotropic Melt, the disclosure of which is incorporated herein by reference. In particular, the polyesters described therein which comprise recurring units of formulae:

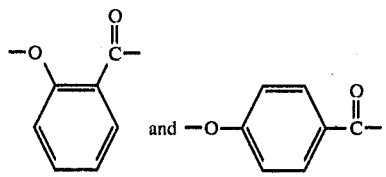

wherein the mole ratio of ortho-substituted residues to para-substituted residues is between 5:95 and 75:25, are particularly suitable for conversion to the shaped articles of the present invention. In these polyesters the residues of the o-hydroxybenzoic acid unit have been found to be labile at elevated temperatures so that on prolonged heating these polyesters are converted essentially to the polymer of p-hydroxybenzoic acid.

In addition to this preferred prepolymer copending British Application of even date herewith discloses other copolyesters containing up to 75 mole % of the labile o-oxybenzoic residues. The other constituents of the polyester may be selected from hydroxyaryl carboxylic acids (as exemplified above), and may contain equimolecular proportions of dihydric phenols and aromatic or cycloaliphatic dicarboxylic acids. Typical dicarboxylic acids include acids of formula:

HOOC—X—COOH wherein X may be a radical selected from 1,4-phenylene, 1,3-phenylene, 1,2-phenylene, 5-sulpho-1,3-phenylene, 2-chloro-1,4-phenylene, 2-bromo-1,4-phenylene, 2-methyl-1,4-phenylene, 2,6-dimethyl-1,4-phenylene, 1,4-cyclohexylene, 4,4-biphenylene, 2,6-naphthalene, 4,4-biphenylene, ethylene dioxybis(1,4-phenylene) and radicals in which X may be:

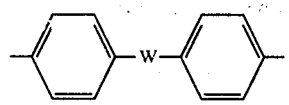

where W is —O—, —SO$_2$— or —C(CH$_3$)$_2$—.

It is preferred that at least one of the dicarboxylic acids is one of the cheaper, readily available acids, particularly terephthalic acid and including isophthalic acid, 2,6-naphthalene dicarboxylic acid and ethylenedioxy-4,4'-dibenzoic acid.

Suitable dihydric phenols are of formula:

O—Y—O wherein Y is a divalent aryl radical comprising one or more fused or separate aromatic rings. Typical radicals include those in which Y is 1,4-phenylene, 4,4'-biphenylene, 2,6-naphthalene, chloro, bromo, methyl, 2,6-dichloro, 2,6-dimethyl-1,4-phenylene or chloro-4,4'-biphenylene, 3,5',5,5'-tetra-alkyl-4,4'-biphenylene and units of formula:

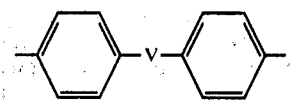

where Y is —O—, —C(CH$_3$)$_2$—, or —SO$_2$.

Yet again the copolyester may comprise units derived from dihydric phenols, aromatic or cycloaliphatic dicarboxylic acids, hydroxyaryl carboxylic acids in which the hydroxyl and carboxyl groups are separated by at least three carbon atoms together with the units of formula:

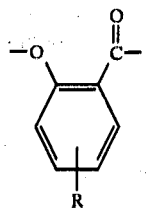

In such compositions the property of forming anisotropic melts without the application of shear is not obtainable with such high molar concentrations of the o-substituted material as in the p-oxycarboxy:o-oxycarboxy polyester described above. The anisotropic melt property as observed in a melt at rest may disappear when the molar concentration of the o-substituted material exceeds about 30 mole % although anisotropic melts may be observed in the same composition if shear is applied to the melt. In practical terms the need to apply shear is no great disadvantage because shear is invariably applied in some form during the fabrication of shaped articles.

Typical of the latter type of copolyester are copolyesters containing residues of o-hydroxybenzoic acid, p-hydroxybenzoic acid, terephthalic acid, isophthalic acid and 4,4'-isopropylidene diphenol.

The choice of the composition of the prepolymer containing the labile constituent is governed by several considerations. The prime consideration is the level of physical and chemical performance required of the shaped article. Where an extremely high level of performance is required the concentration of any non-labile constituent which might lead to a reduction in performance, such as a lowering of the melting point, should be reduced to a minimum or avoided altogether. In general, the prepolymer should contain the minimum of such non-labile materials consistent with obtaining adequate melt processing properties. Consideration should also be given to the temperature at which the labile constituent can be removed. There should be little or no tendency for the prepolymer to exhibit thermal decomposition at a temperature below that required to remove the labile constituent. Additionally, the softening point of the prepolymer should be high enough for the shaped article to maintain its integrity during the heat treatment. In general the softening point of the prepolymer will increase progressively as it loses its labile residues so that it is possible to steadily increase the temperature of the shaped article without losing the integrity of the shaped articles.

The concentration of labile constituents in the prepolymer may vary over wide limits but it is preferred that there is only sufficient to confer melt processability on the polyester. Although it may be possible to recover the volatilised labile constituent so that it can be reused it is clearly advantageous and more economic if the amount of labile constituent that needs to be removed in forming the shaped article of the invention can be reduced to a minimum.

The choice of labile constituent is restricted to those units which can be split out from the prepolymer to form directly or by self-condensation a stable molecule. This elimination must be possible at a temperature below the melting point of the final polymer but close to the melting point of the prepolymer. Such units are those which permit the prepolymer to adopt a molecular configuration very little different from that of the polymer forming the eventual shaped article. In this way bond-breaking to permit elimination can occur almost concurrently with bond formation to link the resulting polymer residues with little molecular movement, thus reducing the free energy required to activate the process to the level of thermal energy available below the melting point of the final polymer. To ensure that the reversible reaction

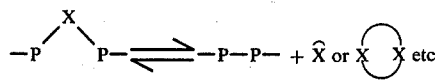

(where X is a labile constituent and P is a non-labile constituent in the prepolymer) is predominantly in favour of the forward reaction, the eliminated fragments must be stable directly or as a result of self-combination to form a dimer, trimer, etc. It is envisaged that these requirements are achievable from units which can adopt stable cyclic configurations in the prepolymer. For example, a prepolymer suitable for forming a homopolyester of p-hydroxybenzoic acid is envisaged as being represented by

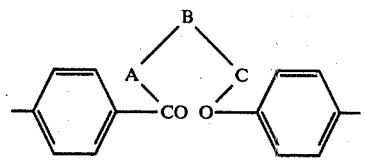

where the distances between the —CO— and —O— groups and the distances between the A and C groups are similar to the lengths of stable bonds in organic compounds. Suitable units of A would be —O— and —NH— groups. Suitable units of C would be —CO—, —SO$_2$— and —CH$_2$— groups. Suitable units of B would be

(where n is 3, 4 or 5) and a direct link between A and C. In general, the most suitable labile constituents are chosen from monomers which are capable of self-condensation to a polymer which can be thermally depolymerized to give the monomer or dimer and trimers, etc of the monomer.

Suitable units include those of formula:

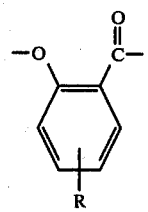

wherein R may be hydrogen, chlorine, bromine or alkyl groups containing 1 to 4 carbon atoms, caprolactam, caprolactone and substituted caprolactams and substituted caprolactones.

The invention is further illustrated by reference to the following Examples.

EXAMPLE 1

A copolyester was prepared from equimolar proportions of acetyl salicylic acid and p-acetoxybenzoic acid. The procedure used was to charge the reactants to a 100 ml 3-necked glass flask fitted with a nitrogen inlet, a stirrer and a condenser and receiver. The flask was placed in a Wood's metal bath at 280° C. which was raised to 325° C. over the course of the reaction. The apparatus was purged with nitrogen before heating. A vacuum of 0.5 mm of mercury was applied after the initial evolution of volatile products. Reaction periods of about 1 hour were used. At the end of the reaction period the products were cooled under nitrogen.

A light brown coloured polymer was obtained. The polymer was found to melt at about 200° C. to form a liquid crystal depolarising melt. The degree of depolarisation was increased markedly under slight shear.

The melt was slightly elastic and could easily be drawn into fibres which appeared to be crystalline and moderately oriented (by X-ray examination). The fibres were noticeably stronger than an unoriented extrudate of the polymer.

Fibres were obtained by spinning from a 1.18 mm die, the melt being extruded at a shear rate of 30 sec$^{-1}$ and the fibres subsequently being drawn down. A range of temperatures between 200° C. and 260° C. were examined. The optimum performance was obtained at a temperature of 220° C., with uniform fibres about 0.15 mm in diameter being obtained.

A 0.17 g sample of these fibres were cut into 10 cm lengths and placed in a vacuum tube containing a thermometer. Vacuum was applied to give a vacuum of less than 0.1 mm of mercury and the tube was placed in a vertical position in a metal bath at a temperature of 280° C. When the temperature in the tube reached 240° C. traces of sublimate were noted in a cooler part of the tube and the ends of the fibres resting on the base of the tube began to soften. After 1 hour the temperature was raised over a period of 1 hour to 360° C. This temperature was maintained for a further hour. Considerable deposits had formed in the end of the tube remote from the heating bath. The fibres at this stage had a black metallic appearance. After cooling under vacuum the fibres were removed from the tube and then replaced in an inverted position to equalise the heat treatment. Vacuum was applied and the temperature raised to 400° C. for 30 minutes. After cooling under vacuum the fibres were found to have lost about 45% in weight and to have shrunk to about 4 cm.

A further sample of the original fibres were clamped in a metal frame and again heated under a vacuum of about 0.1 mm and an initial temperature of 200° C. rising to 270° C. over 2 hours, to 300° C. over a further hour, to 375° C. over the next two hours and finally at 400° C. for 30 minutes. The resulting fibres of a brown-black metallic appearance were cooled under vacuum. The fibres appeared to have an exceptionally high flexural modulus. The fibre was found to be highly crystalline and to have an X-ray diffraction pattern corresponding to that of poly(p-hydroxybenzoic acid). This was confirmed by infra-red and elemental analysis.

EXAMPLE 2

The polymer prepared in Example 1 was pressed into a film 8 cm square at a temperature of 280° C. under 20 tons pressure for 3 minutes. A sample of the film (0.96 g) was placed on an aluminium foil support in a vacuum pistol and heated under a vacuum of less than 1 mm to a temperature of 275° C. over a period of 5½ hours. After cooling under vacuum the weight loss was found to be 8.5%. The sample was returned to the vacuum tube and heated for two hours at 300° C. to 356° C. under a vacuum of about 0.2 mm. After this time sublimation of volatile material appeared to be completed.

The weight loss at this stage was found to be a further 43% (51.5% in total) and the density had increased from an original value of 1.35 to 1.41.

I claim:
1. A process for preparing a shaped article of a normally intractable polymer comprising forming a shaped article of a melt processable copolymer comprising:
   (1) the recurring units which make up the intractable polymer and
   (2) labile in-chain polymer recurring units, heating the copolymer article under conditions such that the labile units are removed from the copolymer and the remaining units combine to form an intractable polymer wherein the integrity of the shaped article is maintained.

2. A process according to claim 1 in which the labile recurring units of the copolymer used to form the shaped article are selected from recurring units of formulae:

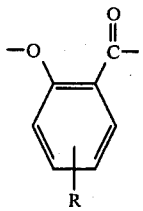

wherein R may be hydrogen, chlorine, bromine or alkyl groups containing 1 to 4 carbon atoms, caprolactam, caprolactone and substituted caprolactams and substituted caprolactones.

3. A process according to claim 1 wherein the shaped article is oriented prior to the removal of the labile recurring units.

4. A process of forming a film or a fibre of a normally intractable polymer according to the process of claim 1 wherein a film or fibre is made from the melt processable polymer and the film or fibre is restrained from shrinking during the removal of the labile recurring units.

5. A process according to claim 1 in which a shaped article consisting essentially of residues of p-hydroxybenzoic acid results after removal of the labile recurring units.

* * * * *